United States Patent [19]
Brown

[11] Patent Number: 5,619,853
[45] Date of Patent: Apr. 15, 1997

[54] EXHAUST SYSTEM WITH A FLUIDICS APPARATUS DIVERTER BODY HAVING EXTENSIONS

[75] Inventor: Jacqueline L. Brown, Corning, N.Y.

[73] Assignee: Corning Incorporated, Corning, N.Y.

[21] Appl. No.: 578,290

[22] Filed: Dec. 26, 1995

[51] Int. Cl.$^6$ ...................................................... F01N 3/00
[52] U.S. Cl. ................................................................ 60/288
[58] Field of Search ............................. 60/288; 239/462, 239/548, 556, 557

[56] References Cited

U.S. PATENT DOCUMENTS

| | | | |
|---|---|---|---|
| 2,661,240 | 12/1953 | Salomonsson | 239/557 |
| 2,887,275 | 5/1959 | Dixon, Jr. et al. | 239/462 |
| 3,062,275 | 11/1962 | Reed | 239/557 |
| 3,144,309 | 8/1964 | Sparrow . | |
| 3,783,619 | 1/1974 | Alquist . | |
| 3,861,143 | 1/1975 | Morgan et al. | 60/288 |
| 3,988,890 | 11/1976 | Abthoff et al. . | |
| 3,995,423 | 12/1976 | Aoki et al. . | |
| 4,023,360 | 5/1977 | Wössner et al. . | |
| 5,067,319 | 11/1991 | Moser . | |
| 5,154,894 | 10/1992 | MacFarlane et al. | 60/288 |
| 5,233,830 | 8/1993 | Takesdhima et al. | 60/288 |
| 5,449,499 | 9/1995 | Bauer et al. . | |

FOREIGN PATENT DOCUMENTS

| | | |
|---|---|---|
| 0661098A2 | 7/1995 | European Pat. Off. . |
| 2240486 | 8/1991 | United Kingdom . |
| 1275772 | 5/1992 | United Kingdom . |
| 95/18292 | 12/1994 | WIPO . |

OTHER PUBLICATIONS

Encyclopedia of Chemical Technology, Third Edition, vol. 15, p. 651.

*Primary Examiner*—John T. Kwon
*Attorney, Agent, or Firm*—Timothy M. Schaeberle

[57] ABSTRACT

The invention is directed to a honeycomb structure having an inlet and outlet end disposed in a housing and located in an exhaust gas stream downstream from an engine. The honeycomb structure possesses a first substantially unobstructed flow region, i.e., a low-flow resistance region, and a second more obstructed flow region adjacent the first region for the exhaust gases in the exhaust gas stream. The exhaust system further includes a fluidics apparatus disposed in the exhaust stream proximate to the center of the first region comprising a diverter body, a diversion fluid source and a conduit possessing an outlet for directing the diversion fluid toward the diverter body. Lastly, the diverter body comprises a main body and at least one pair of extensions, preferably symmetrical extensions.

16 Claims, 17 Drawing Sheets

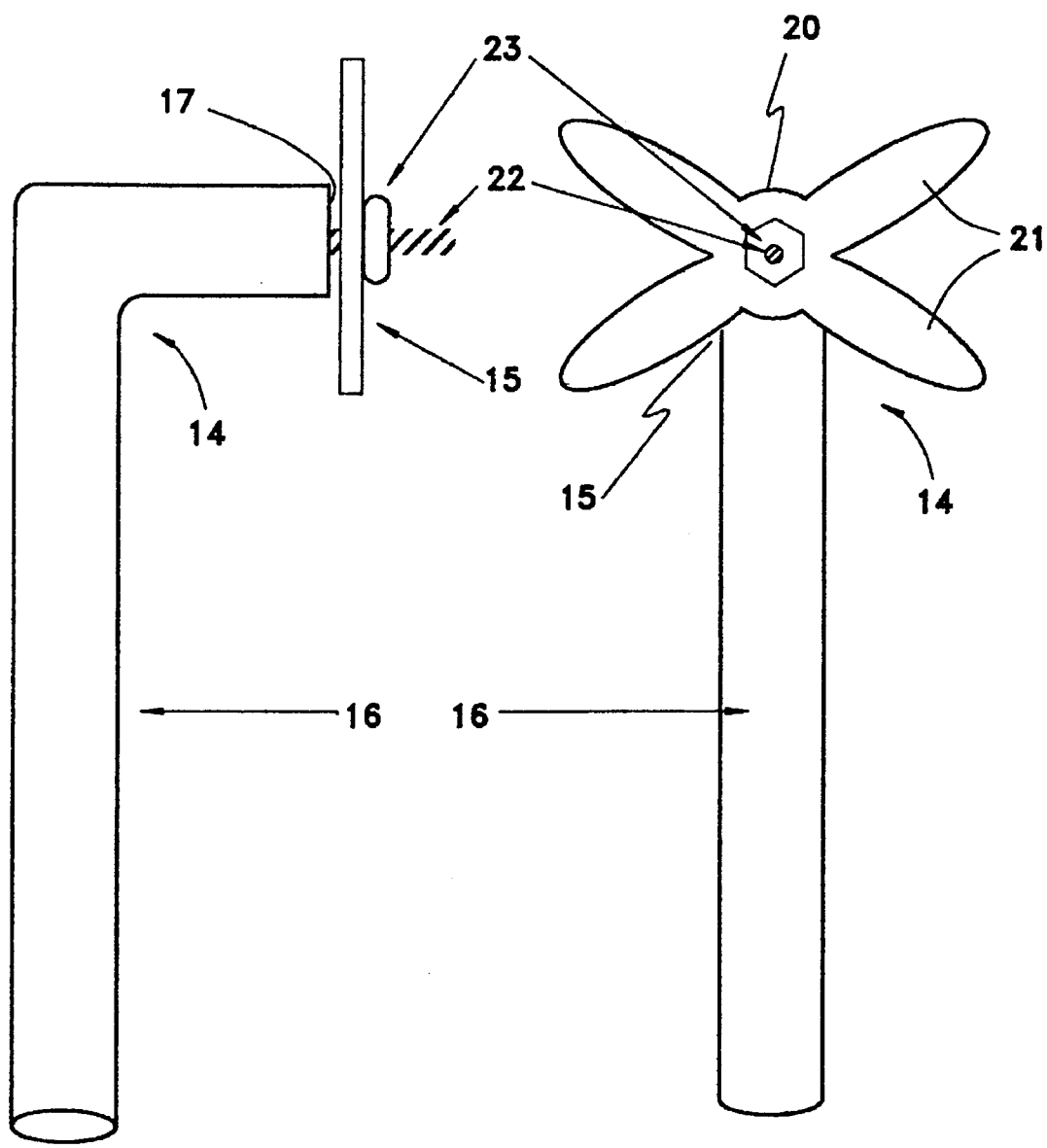

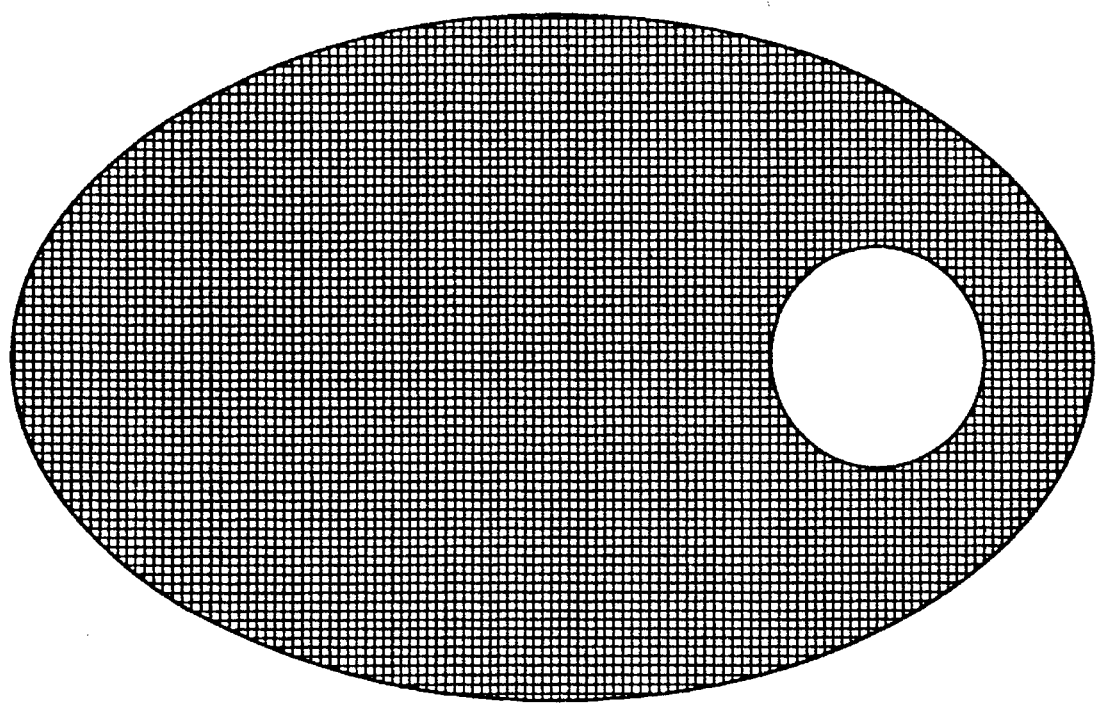
FIG. 22C
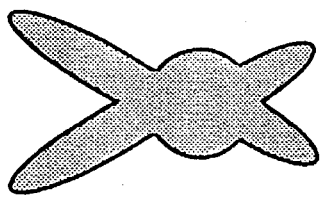 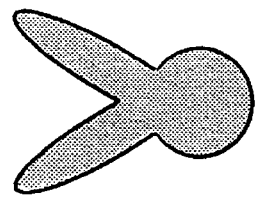
FIG. 22A          FIG. 22B

EXHAUST SYSTEM WITH A FLUIDICS APPARATUS DIVERTER BODY HAVING EXTENSIONS

FIELD OF THE INVENTION

This invention relates to an improved engine exhaust system, and more particularly to an exhaust system comprised of a honeycomb structure having a first substantially unobstructed flow region and a second more obstructed flow region adjacent the first region, and a fluidics apparatus having a diverter body exhibiting a main body and at least one pair of extensions.

BACKGROUND OF THE INVENTION

While catalytic converters are well known for reducing oxides of nitrogen (NOx), and oxidizing hydrocarbons and carbon monoxide from automobile exhaust, these reactions typically take place after the catalyst has attained its light-off temperature, at which point the catalyst begins to convert the hydrocarbons to harmless gases. The typical catalytic light-off time for most internal combustion engine systems is around 50 to 120 seconds (generally in the range of 200°–350° C.), with the actual catalytic light-off time for any system depending on a number of factors; including, the position of the catalyst relative to the engine, the aging of the catalyst, as well as the noble metal loading. Seventy to eighty percent of hydrocarbon emissions from automotive vehicles are emitted during this first minute, or so, of "cold start" engine operation. Without additional measures large amounts of hydrocarbons are likely to be discharged into the atmosphere during this period. The problem is made worse by the fact that the engines require rich fuel-air ratios to operate during cold-start thus, increasing even further the amount of unburned hydrocarbons discharged. Environmentally, increasing the effectiveness of automotive emission control systems during cold start, so that the amount of hydrocarbons discharged into the atmosphere during cold-start are kept at extremely low levels, has become increasingly important.

Various schemes have been proposed for meeting the stringent hydrocarbon emission standards during cold start including, the use of electrically heated catalysts (EHCs) to reduce the light-off time of the main catalyst, the use of molecular sieve structures (hydrocarbon adsorbers) to adsorb and hold significant amounts of hydrocarbons until the converter has attained its light-off temperature, as well as combinations of both.

Recently, improved in-line and by-pass exhaust control systems respectively have been disclosed in U.S. application Ser. Nos. 08/375,699 (Guile et al.) and 08/484,617 (Hertl et al.); both co-assigned to the instant assignee, and herein incorporated by reference. The Guile reference discloses a by-pass adsorber system wherein flow patterns from a secondary air source are used to direct exhaust gas flow to and away from the adsorber during cold-start.

The Hertl reference discloses an in-line exhaust system having a main catalyst, a housing downstream of the main catalyst having an inlet and an outlet end, and having disposed therein a molecular sieve structure for adsorbing hydrocarbons. The molecular sieve structure exhibits: (1) a first region forming an unobstructed or substantially unobstructed flow path for exhaust gases of an exhaust stream; and, (2) a second, more restricted flow path or region adjacent the first region. Furthermore, the exhaust system includes a burn-off catalyst disposed downstream from the adsorber having a light-off temperature. Lastly, the system includes a diverting means disposed in the housing for passing secondary air into the housing; the flow pattern of the secondary air directs a portion of the exhaust gases of the exhaust stream through the second region of the adsorber prior to the main catalyst attaining its light-off temperature.

Although, the system of Hertl performed better than earlier exhaust systems, environmental concerns and legislation drafted to meet those concerns continues to lower legally acceptable hydrocarbon emission standards, e.g., the California ultra-low emission vehicle (ULEV) standards. Notwithstanding the foregoing developments, work continued to discover improvements to existing systems and to provide new systems capable of meeting the stricter exhaust emission standards.

One such improvement is disclosed in copending, coassigned application, U.S. Ser. No. 08/578,003 (Brown et al.) wherein it discloses an exhaust system comprised of the following: (1) a honeycomb structure having an inlet and outlet end disposed in a housing and possessing a first substantially unobstructed flow region, a second more obstructed flow region adjacent the first region; and, (2) a fluidics apparatus disposed in the exhaust stream proximate to center the first region for creating a negative flow zone within the first region. The fluidics apparatus of Brown includes a source of a diversion fluid, typically air, and a diverter body for diverting the diversion fluid, both of which combine to result in the negative flow zone and for diverting the exhaust gas away from the first flow region toward the second flow region.

Although this system provides improved performance for both round and elliptical substrates, the resulting flow for elliptical substrates and round substrates with off-center second flow regions tends to non-uniform Accordingly, it is one of the objectives of the instant invention to provide a engine exhaust system having elliptical and round substrates with off-center second flow regions that exhibit increased flow performance, i.e., enhanced flow uniformity.

SUMMARY OF THE INVENTION

Accordingly, the present invention is directed at an exhaust system comprising a honeycomb structure having an inlet and outlet end disposed in a housing and located in an exhaust gas stream downstream from an engine. Additionally, this honeycomb structure possesses a first substantially unobstructed flow region, i.e., a low-flow resistance region, and a second more obstructed flow region adjacent the first region for the exhaust gases in the exhaust gas stream. The exhaust system further includes a fluidics apparatus disposed in the exhaust stream proximate to the center of the first region comprising a diverter body, a diversion fluid source and a conduit possessing an outlet for directing the diversion fluid toward the diverter body. The diverter body comprises a main body and a at least one pair of extensions, preferably symmetrical.

One advantage of this exhaust system is that in those applications where the substrate is non-round and the low-flow resistance region is located in the center of the substrate with the adjacent higher flow resistance region located on the periphery, a uniform diverted flow is obtained in the peripheral region. In other words, the diverted exhaust flow pattern for elliptical honeycomb substrates in the peripheral cells is relatively uniform. This uniform exhaust flow through the peripheral area permits a more effective use of the honeycomb surface area. Specifically, in those applications wherein the substrate is a catalyst, more catalyst surface area is effectively utilized resulting in more efficient catalyzation. On the other hand, when the substrate is comprised of an adsorber, the increase in flow uniformity results in the utilization of more adsorber surface area and ultimately better adsorption of the hydrocarbons.

BRIEF DESCRIPTION OF THE FIGURES

FIG. 7 is a front view of one embodiment of a fluidics apparatus having a diverter main body with extensions, utilized in the inventive exhaust system.

FIG. 8 is a side view of the same fluidics apparatus as depicted in FIG. 7.

FIG. 22 A, B, C and 23 A, B, C, are illustrations of additional embodiments of diverter bodies and of substrates useful in the instant exhaust system;

DETAILED DESCRIPTION OF THE INVENTION

The flow patterns of exhaust gases which result when a diverter system is operational are described in great detail in the copending Brown and Hertl applications. As described therein, generally, the exhaust gases are directed towards the honeycomb structure whereupon a fluidics apparatus located proximate to the inlet of the low resistance flow region, diverts the exhaust gases. The operation of the fluidics apparatus specifically involves directing a diversion fluid toward and into contact with a diverter body, and thereby causing the diversion fluid to exhibit a flow component transverse to the flow direction in the central or first flow region; i.e., radially diverting the diversion fluid. Specifically, this diversion fluid is diverted into the path of the exhaust gas to direct at least a portion of the exhaust gas into the second flow or peripheral region.

The size and shape of the diverter body utilized in the fluidic apparatus of the exhaust system should be such that it results in a uniform flow through the honeycomb cells of the honeycomb substrate when the diversion fluid is on. Ideally, a negative flow, as disclosed in Brown et al., or low positive flow of less than 20% of total exhaust should pass through the low-flow resistance region or path. An exhaust flow which is relatively uniform through the honeycomb body results in a better utilization of the entire honeycomb surface. Furthermore, when the diversion air is off the diverter body should permit maximum flow through the center hole with little exhaust diverted through the honeycomb body. Lastly, it should be noted that it is critical that the diverter body configuration should develop minimum back pressure in the system.

Figure 1:
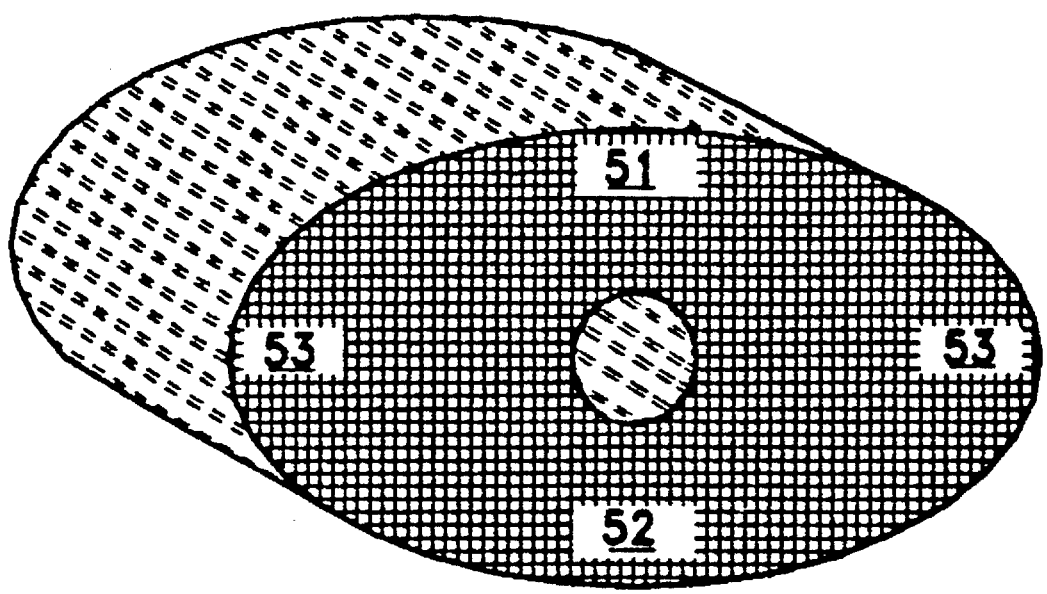
FIG. 1 is a perspective view of an elliptical honeycomb.

Round substrates with centered holes require only simple round diverter bodies to produce the desirable uniform flow patterns. However, elliptical-shaped substrates as depicted in FIG. 1 are more typically used for under car applications due to space considerations. If a hole is centered in the face of the elliptical substrate, there are fewer cells in the area to the top 51 and bottom 52 of the hole than to the sides 53. Round diverter bodies evenly distribute the diversion air and thus the exhaust to all areas of the substrate. In the elliptical substrate, exhaust flow rates will thus be higher through the top and bottom areas than through the sides, as the same volume of exhaust must pass through a smaller area in the same amount of time, thus resulting in a very inefficient use of the honeycomb substrate cell surface area.

Figure 2:
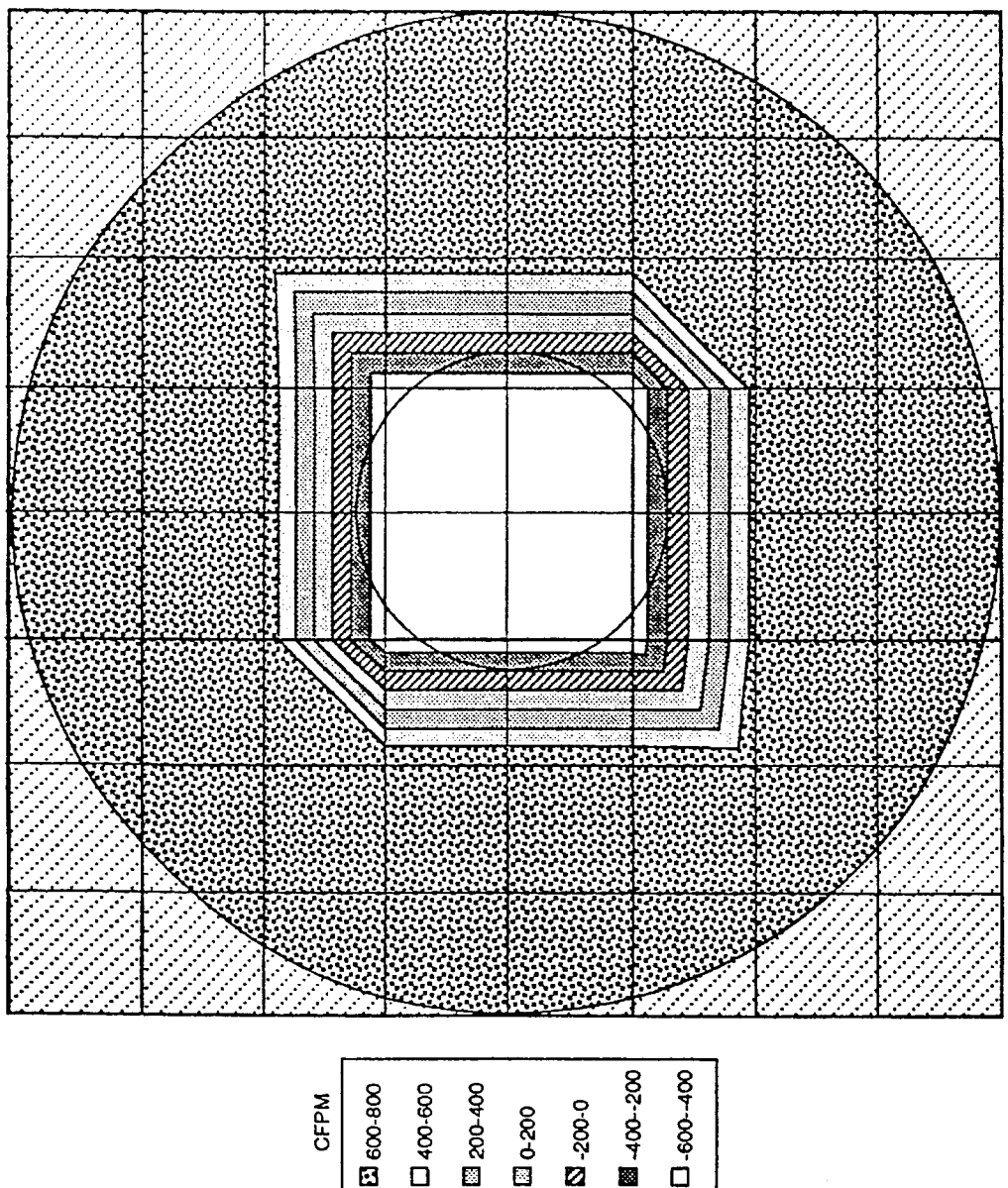
FIG. 2 is a graphical illustration of a typical uniform flow profile of a round honeycomb substrate under diverted exhaust flow conditions using a round diverter body.

Referring now to FIG. 2, depicted therein is a typical and desired uniform flow profile exhibited by a round substrate possessing a fluidics apparatus comprising a round diverter body; the round substrate and low-flow resistance region image is seen as superimposed on the flow profile. Specifically, a desired positive, high and uniform flow rate through the substrate periphery cells and a negative flow rate in the center hole.

Figure 3:
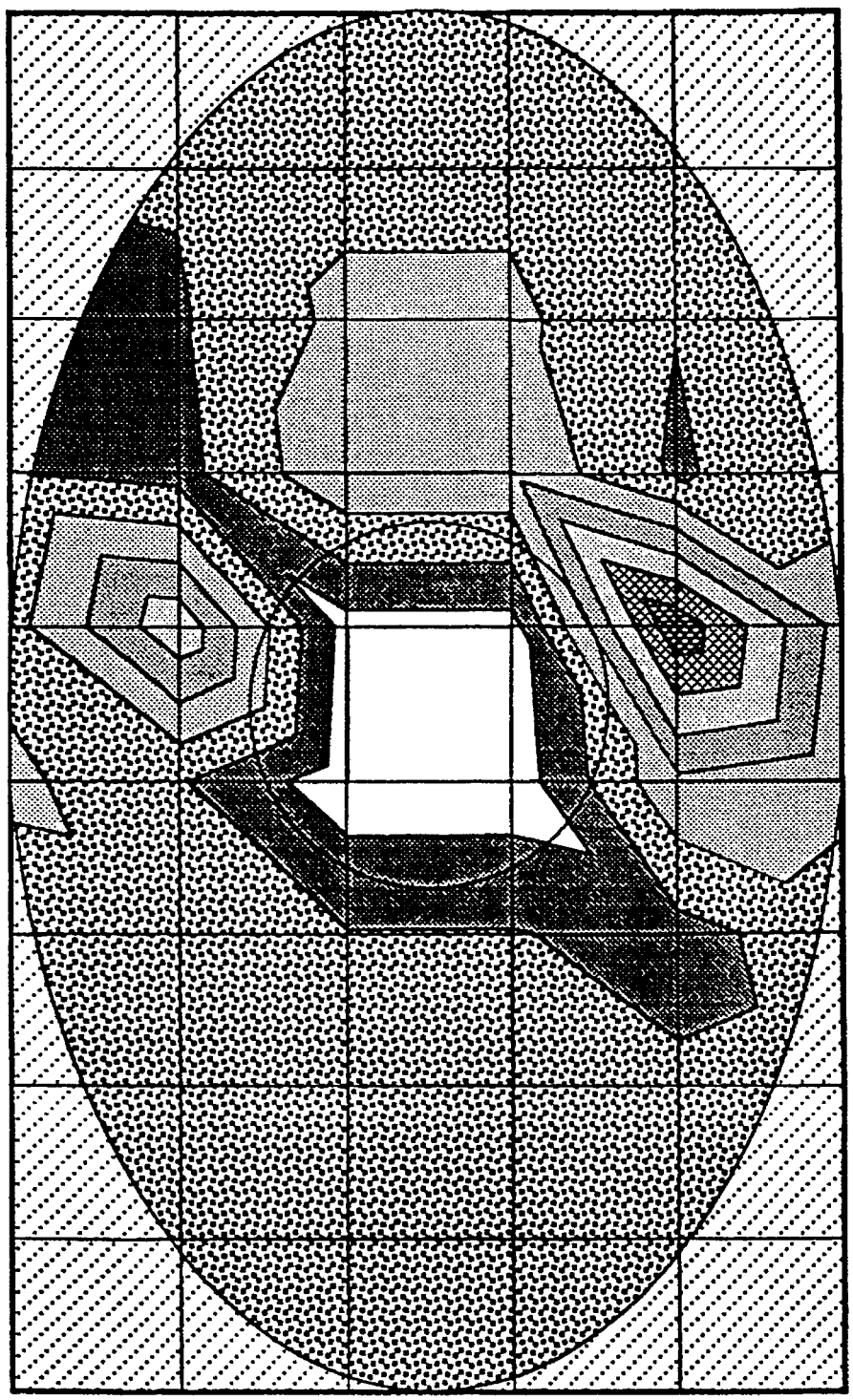
FIG. 3 is a is a graphical illustration of the typical non-uniform flow profile of an elliptical honeycomb under diverted exhaust flow conditions using a round diverter body.
Figure 4:
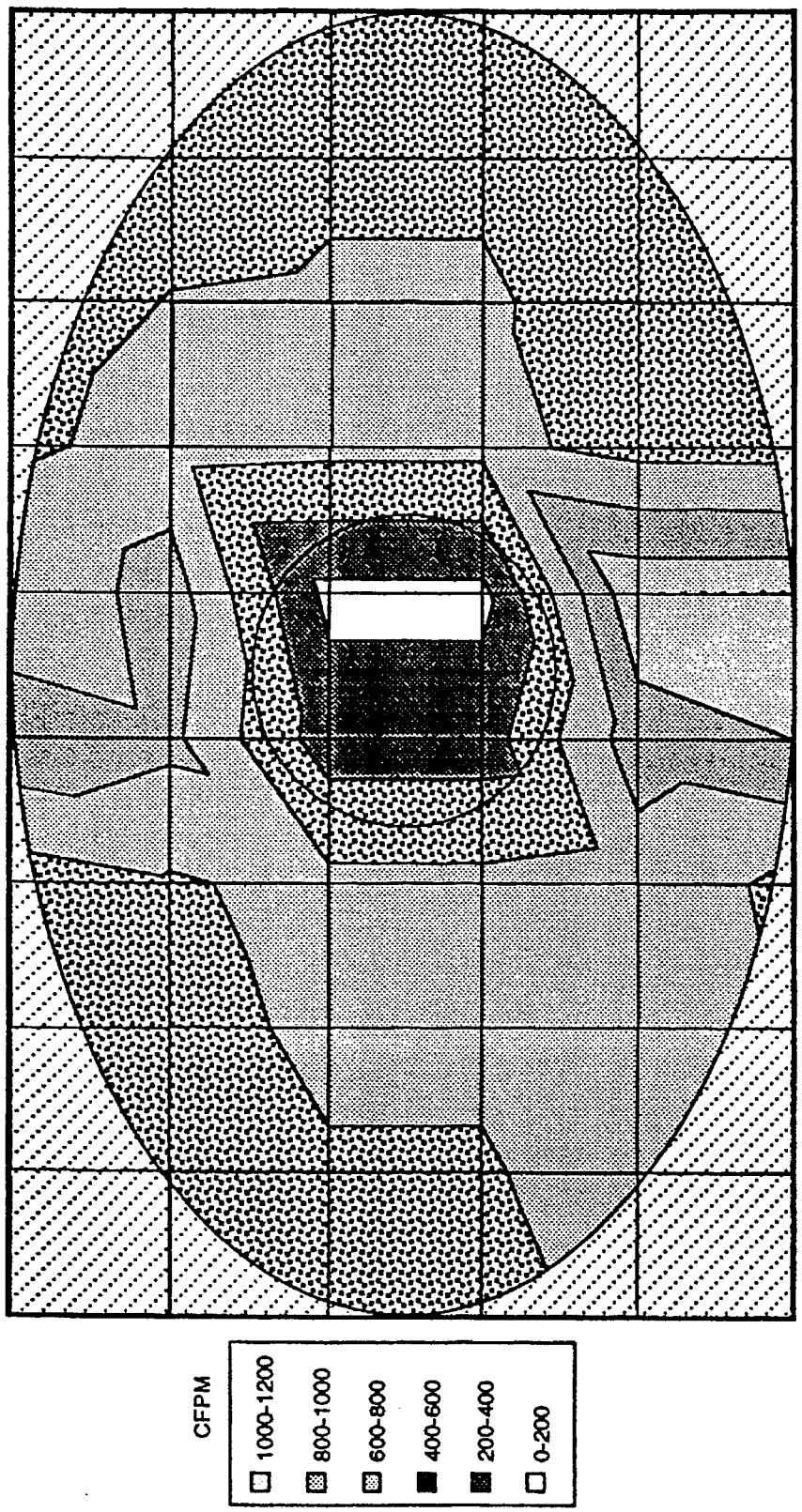
FIGS. 4 and 5 are graphical illustrations of the typical non-uniform flow profile of an elliptical honeycomb under diverted exhaust flow conditions using an elliptical diverter body.
Figure 5:
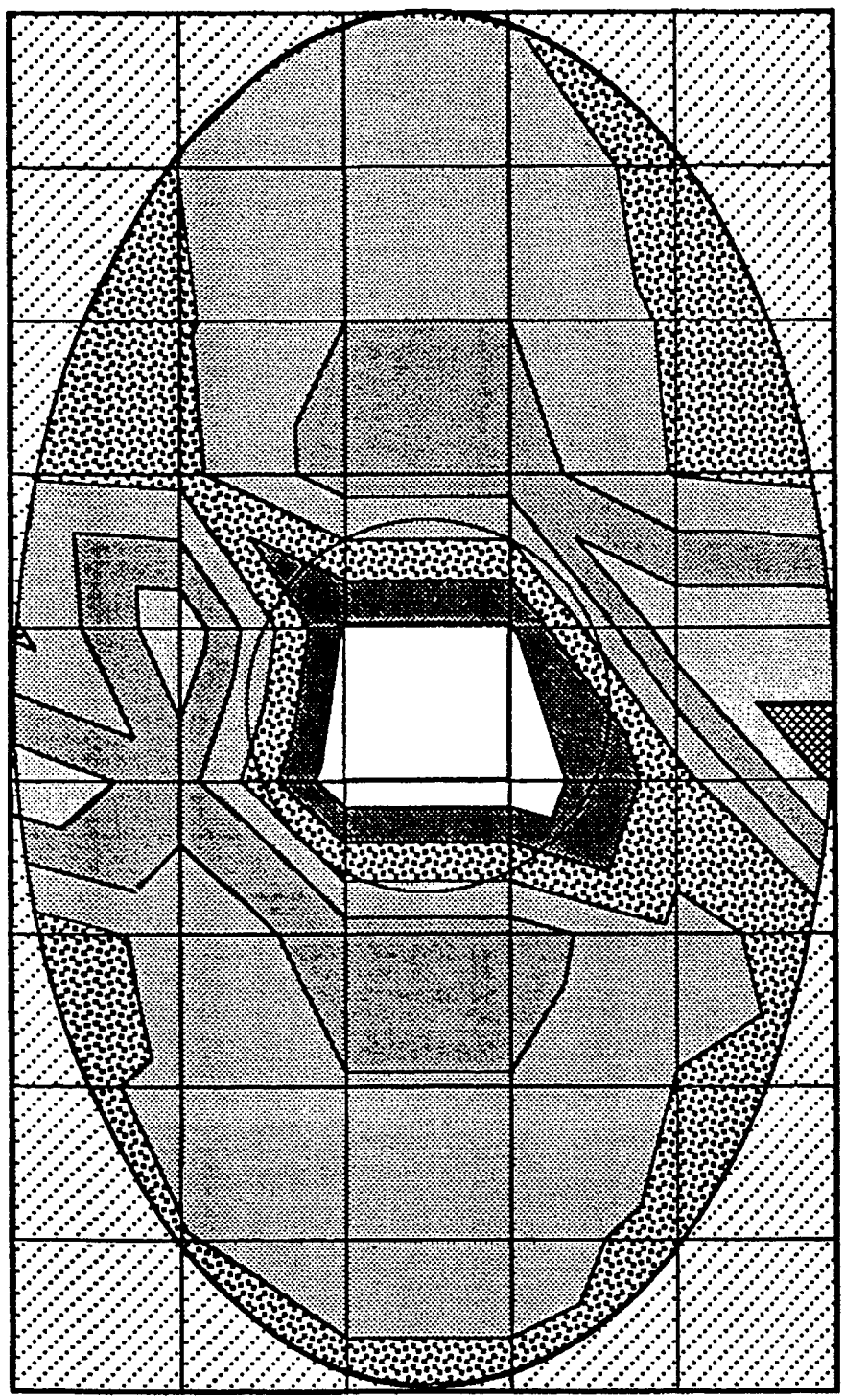

Illustrated in FIG. 3 is the typical non-uniform flow profile exhibited by a elliptical substrate possessing a fluidics apparatus comprising a round diverter body. Specifically, FIG. 3 illustrates an average high flow rate through the cells of the periphery, but the pattern is not uniform; it is much higher at the top and bottom of the hole than at the sides. Referring now to FIGS. 4 and 5, illustrated are two non-uniform flows which represent the typical flow profile exhibited by a elliptical substrate possessing a fluidics apparatus comprising a elliptical diverter body; the diverter's long axis oriented parallel with the long axis of the substrate in FIG. 4 and oriented perpendicular in FIG. 5. Specifically, the FIGS. illustrate that the orientation of the diverter body does little to change the resultant non-uniform flow profile; i.e., a resultant flow in which there is very high positive flow in the top and bottom cells of the periphery and a lower positive flow in the peripheral cells on the sides.

Again, it should be noted that the actual substrate and the low-flow resistance region image are superimposed on each of the flow profiles.

Figure 6:
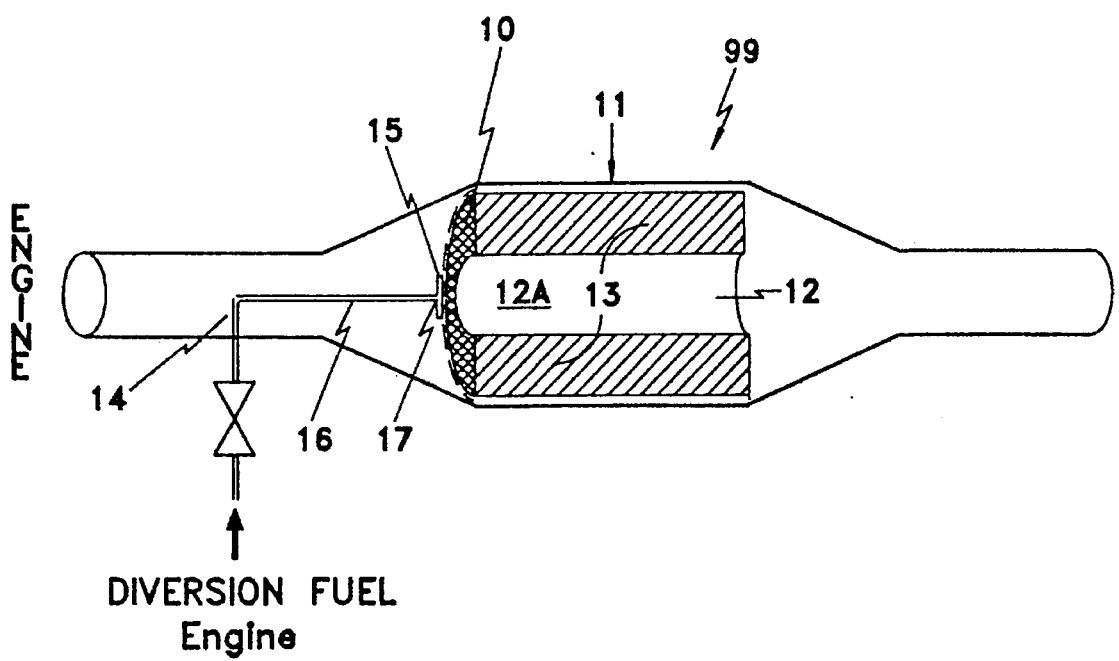
FIG. 6 is a sectional (longitudinal) view of the invention showing an exhaust system in which exhaust gas flows from the engine to the honeycomb structure.

The instant invention is directed at an engine exhaust system which seeks to overcome the aforementioned shortcomings of the non-uniform diverted flow characteristic of previous exhaust systems comprising elliptical substrates and utilizing a fluidics diverter. In other words, this inventive exhaust system provides increased flow performance, i.e., an enhanced flow uniformity, even for elliptical substrates and round substrates with off-center second flow regions. Referring now to FIG. 6 depicted therein is the engine exhaust system 99 of the present invention. The system 99 comprises the following: (1) a honeycomb structure 10 having an inlet and outlet end disposed in a housing 11 and located in an exhaust gas stream downstream from an engine (not shown), and having a first substantially unobstructed flow region 12, and a second more obstructed flow region 13 adjacent the first region; and (2) a fluidics apparatus 14 disposed in the exhaust stream proximate to the center of the first region 12 comprising a diverter body 15, a diversion fluid source (not shown) and a conduit 16 possessing an outlet 17 for directing the diversion fluid toward the diverter body.

The conduit outlet 17 is positioned sufficiently close to the diverter body 15 whereby the diverter body 15 imparts a flow component to the diversion fluid which is transverse to the flow direction of exhaust gases in the first region. In one embodiment, this exhaust system 99 is configured such that the fluidics apparatus 15 is positioned whereby a negative flow zone 12A is created within the first region 12; i.e., a flow of fluid in a direction opposite that of the exhaust gas flow.

Figure 9:
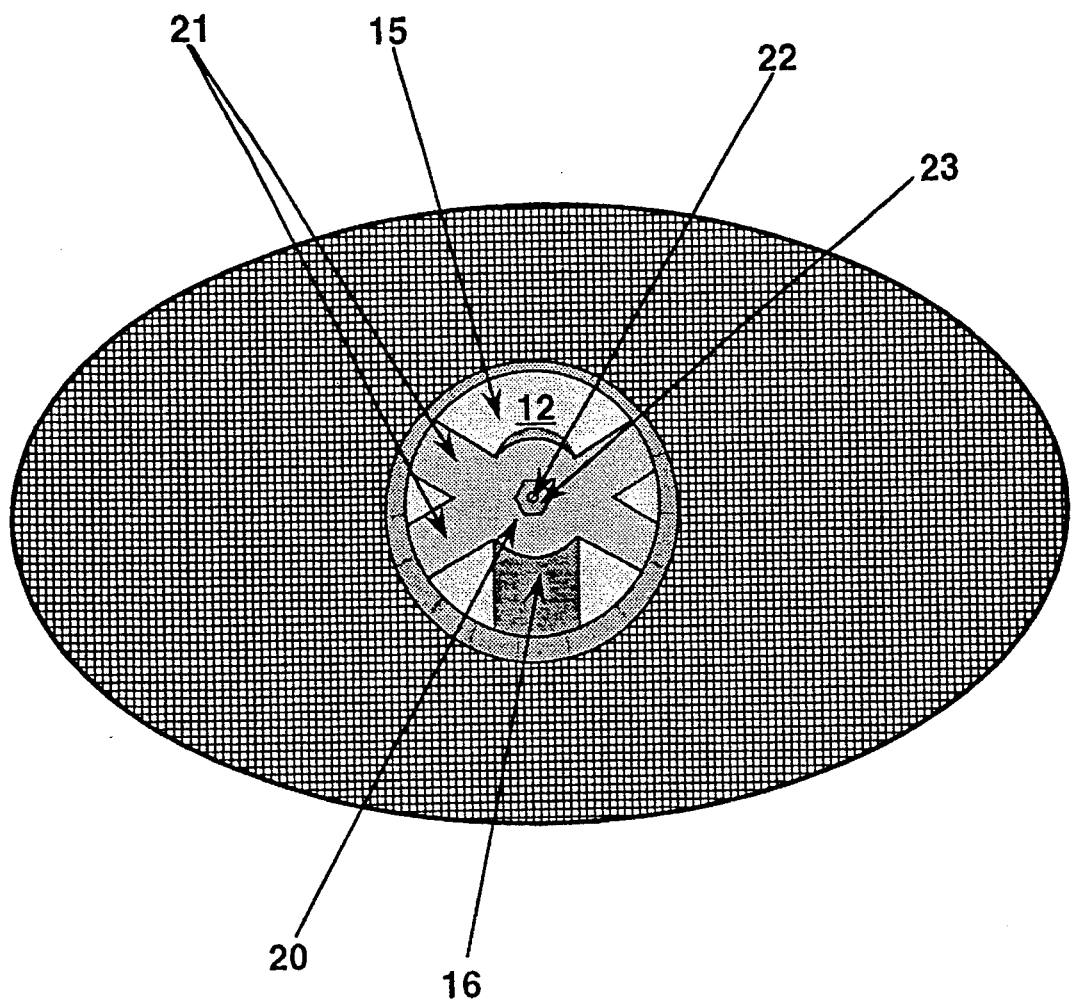
FIG. 9 is an illustration of the outlet end or downstream face of an elliptical honeycomb substrate and the fluidics apparatus.

Referring now to FIGS. 7, 8 and 9 depicted therein are enlarged views of one embodiment of a fluidic apparatus 14 usable in the exhaust system described herein; specifically, FIG. 9 is a view through from outlet face into a honeycomb substrate, the fluidics apparatus 15 partially seen through the first region area 12. The diverter body 15 exhibits a main body 20 and at least one pair of extensions 21 and is positioned, a variable slot distance W, in front of the outlet 17 of a diversion fluid conduit 16, through the use of a diverter support system (not shown). Diverter support system is secured within the inside circumference of the conduit 16 and includes a threaded post 22. Diverter 15 is directly attached to threaded post 22 through a nut 23 thereby allowing for the slot width W to be varied.

The diverter body 15 comprising main body 20 and at least one pair of extensions is critical in developing the uniform diverted exhaust flow through the cells of the periphery; i.e., the configuration of the diverter body, main body and extensions, is important to the development of the uniform flow. Referring now to FIGS. 10–15 depicted therein are various diverter body configurations, AA–FF, respectively, exhibiting elliptical or round shaped main bodies having two pair of symmetrically angled extensions attached to opposite horizontal ends of the main body, i.e., "X-shaped" diverter bodies. Table I records the dimensions of these various "X-shaped" configurations as used in the later described Examples, including the round main body diameter (D) or the elliptical long and short axis dimensions (L×S), the horizontal and vertical length (H×V) and the extension angle (A). Specifically, the addition of the extensions to the main diverter body (elliptical or round), functions to shape the diversion air to divert more exhaust to the side and less to the top and bottom of the elliptical substrate.

Figure 10:
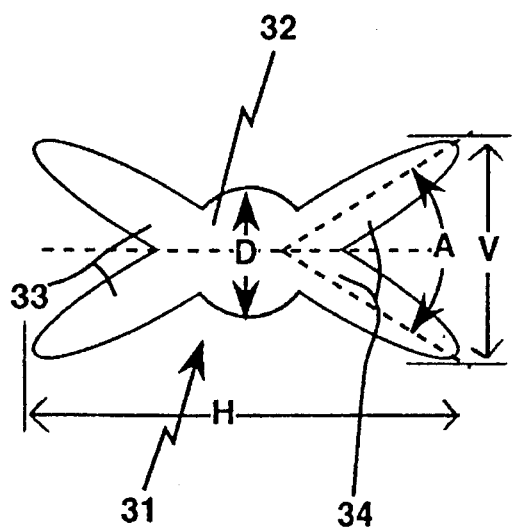
FIGS. 10–15 illustrate various "X-shaped" diverter body configurations.
Figure 13:
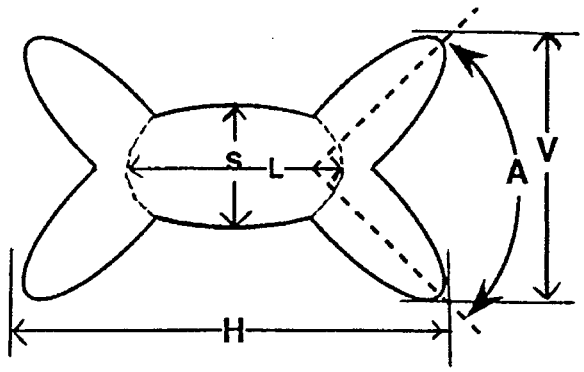
Figure 11:
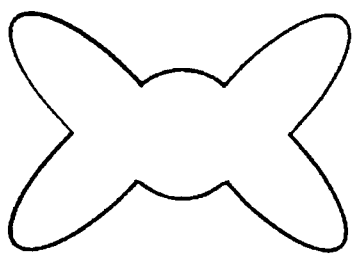
Figure 14:
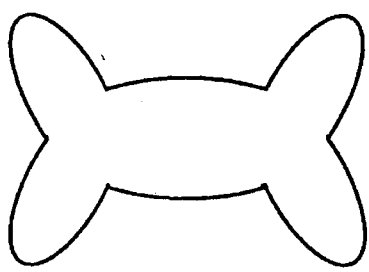
Figure 12:
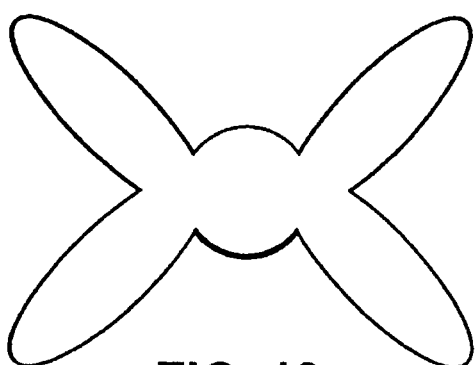
Figure 15:
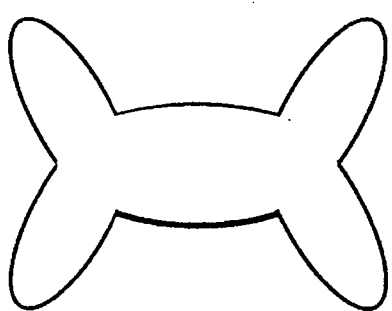
Figure 16:
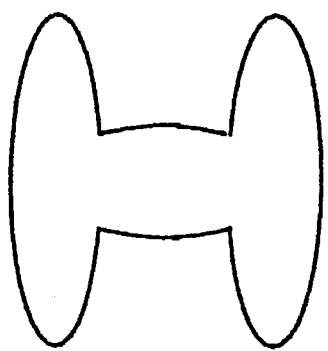
FIGS. 16–20 illustrate various "H-shaped" diverter body configurations.
Figure 19:
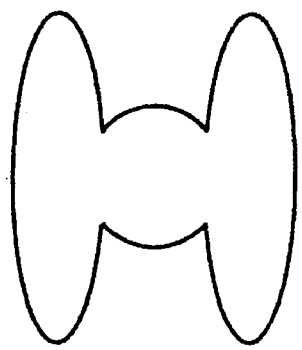
Figure 17:
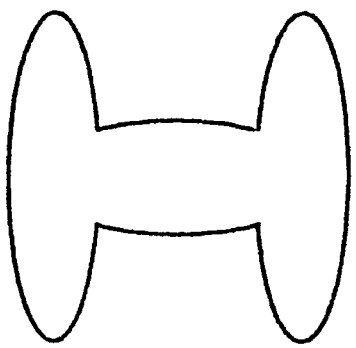
Figure 20:
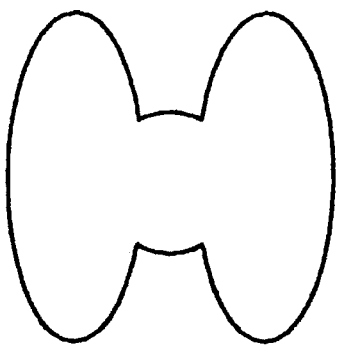
Figure 18:
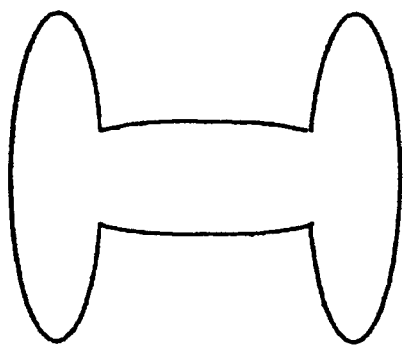

Referring now to FIG. 10 the X-shaped diverter body illustrated is that diverter body designated AA. As depicted therein, the diverter 31 is comprised of a round main body 32 having two symmetrical pairs of extensions, 33 and 34, positioned on opposite sides of the round main diverter body 32. Each individual extension is positioned whereby it forms approximately a 30° angle θ with the horizontal axis of the main diverter body 32. Furthermore, the extensions exhibit a length whereby the diverter body measures 2.09×1.06 in. (5.3×2.7 cm). It should be noted that the size of the main body, the angles of the extensions and the extension length are preferred for the particular honeycomb substrate (and low-flow resistance region) utilized in later Examples 1–3. The main body size and the extension angles and lengths which will be most effective will vary for each various honeycomb substrate configuration and will therefore, have to be determined on an empirical basis.

TABLE I

| Diverter Body No. | D (in/cm) | L × S (in/cm) | H × V (in/cm) | A (°) |
|---|---|---|---|---|
| AA | 0.63 1.60 | — | 2.09 × 1.06 5.3 × 2.7 | 60 |
| BB | 0.63 1.60 | — | 1.67 × 1.18 4.25 × 3.0 | 90 |
| CC | 0.63 1.6 | — | 1.79 × 1.38 4.55 × 3.5 | 90 |
| DD | — | 1.38 × 0.59 3.50 × 1.50 | 2.08 × 1.22 5.3 × 3.1 | 90 |
| EE | — | 1.38 × 0.59 3.5 × 1.5 | 1.76 × 1.18 4.45 × 3.0 | 120 |
| FF | — | 1.38 × 0.59 3.5 × 1.5 | 1.79 × 1.38 4.55 × 3.5 | 120 |

One advantage of this exhaust system is that in those applications where the substrate is non-round and the low-flow resistance region is located in the center of the substrate with the adjacent higher flow resistance region located on the periphery, a uniform diverted flow is obtained in the peripheral region. In other words, the flow pattern for elliptical honeycomb substrates in the peripheral cells at times when the diversion fluid is being utilized is uniform. This uniform exhaust flow through the non-round honeycomb substrate peripheral area permits more effective use of the honeycomb surface area. Specifically, in those applications wherein the substrate is a catalyst, more catalyst surface area is effectively utilized resulting in more efficient catalyzation. On the other hand, when the substrate is comprised of an adsorber, a flow pattern where the higher flow rates are away from the center hole results in the utilization of more adsorber surface area and ultimately better adsorption of the hydrocarbons. Furthermore, a more uniform flow in those adsorber applications helps to avoid premature desorption by causing more adsorption to occur away from the low-flow resistance or hole region; since the regions closer to the central region typically heat up faster than those peripheral regions more distant from the center, they tend to desorb faster, sometimes prior than the lightoff of the burn-off catalyst.

Referring now to FIGS. 16–20, depicted therein are additional diverter body configurations useful in the present invention and exhibiting elliptical or round shaped main bodies having vertical extensions attached to either end, i.e., "H-shaped" diverter bodies designated GG–KK, respectively. Table II records the dimensions of various "H-shaped" configurations as used in the later described Examples, including the round main body diameter (D) or the elliptical long and short axis dimensions (L×S), the horizontal and vertical length (H×V) and the elliptical long and short axis (L×S) of the attached extensions (L'×S').

TABLE II

| Diverter Body No. | D (in/cm) | L × S (in/cm) | H × V (in/cm) |
| --- | --- | --- | --- |
| GG | — | 1.34 × 0.59 | 1.22 × 1.18 |
|    |   | 3.40 × 1.50 | 3.4 × 3.0 |
| HH | — | 1.34 × 0.59 | 1.38 × 1.38 |
|    |   | 3.40 × 1.50 | 3.5 × 3.5 |
| II | — | 1.34 × 0.59 | 1.76 × 1.18 |
|    |   | 3.40 × 1.50 | 4.45 × 3.5 |
| JJ | 0.63 | — | 1.26 × 1.18 |
|    | 1.60 |   | 3.2 × 3.0 |
| KK | 0.63 | — | 1.34 × 1.18 |
|    | 1.60 |   | 3.4 × 3.0 |

In one embodiment, the honeycomb structure utilized in this exhaust system is a variable cell honeycomb structure having a first group of cells and a second group of cells whose cell sizes are smaller than the first group of cells. In another embodiment the honeycomb structure is a substantially cellular structure having an open core region running longitudinally parallel between the inlet and outlet ends of the structure and a peripheral region adjacent the open core, the peripheral region having a plurality of cells running longitudinally parallel between the inlet and the outlet ends of the structure.

Another embodiment comprises the honeycomb structure centrally disposed in the housing, having a frontal area, wherein said first region comprises a central open core running longitudinally parallel between the inlet and outlet ends of the structure and the second region comprises a peripheral cellular structure characterized by a plurality of cells running longitudinally parallel between the inlet and the outlet ends of the structure; preferably, the central open core occupying an area in the range of 0.5 to 50% of the front area of the honeycomb structure.

One final embodiment of honeycomb structure comprises a variable cell extruded honeycomb structure having a first central region and a second peripheral region surrounding said first region wherein cells in the first region are larger than the cells in the second region.

Figure 21:
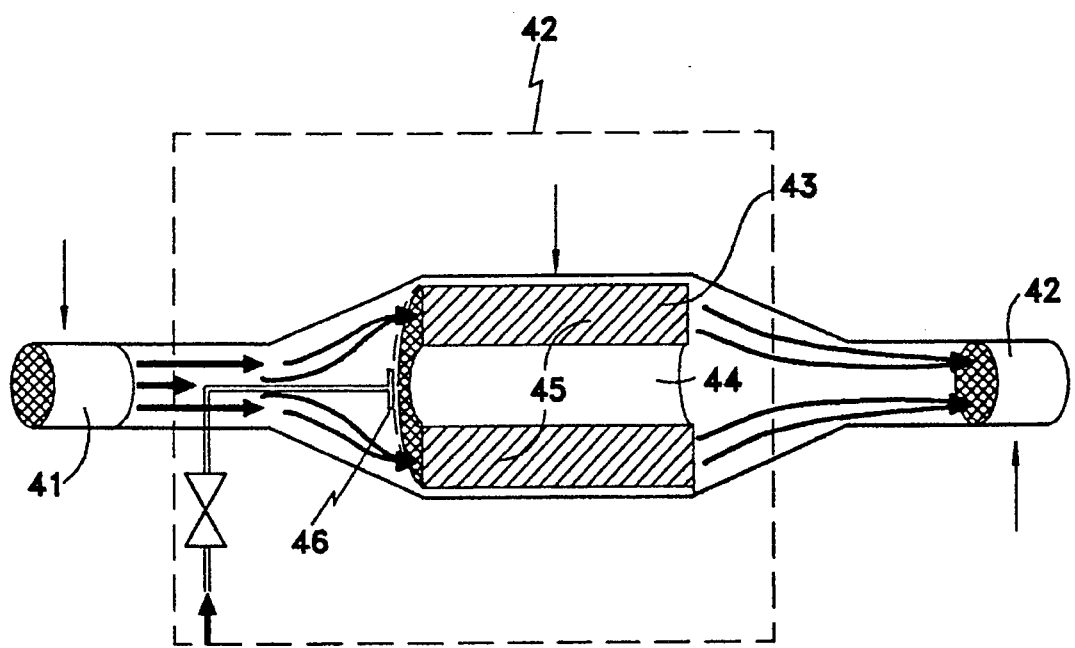
FIG. 21 is a sectional (longitudinal) view of one embodiment of the invention wherein the inventive exhaust system is incorporated into an overall "in-line" exhaust system.

As disclosed in the copending Brown et al. reference, it is contemplated that this fluidics apparatus described above and shown in the examples below, again has particular utility as part of an overall in-line exhaust system as disclosed in the aforementioned Hertl et al. reference, i.e., the honeycomb substrate disclosed hereinabove comprises a molecular sieve or hydrocarbon adsorber. Specifically, referring now to FIG. 21, this in-line exhaust system includes the following: (1) a main catalytic converter 41 having a light-off temperature disposed downstream from an engine; (2) a burn-off catalyst 42 disposed in the exhaust stream downstream from the main catalytic converter 41, and (3) the exhaust system 42 described herein including a honeycomb structure 43 comprised of a molecular sieve or adsorber. More specifically, the honeycomb structure 43, possesses an inlet and outlet end, is located in the exhaust stream between the main catalytic converter 41 and the burn-off catalyst 42, and exhibits a desorption temperature. The molecular sieve/honeycomb structure 43 includes a first substantially unobstructed flow region 44, and a second more obstructed flow region 45 adjacent the first region, the first region being disposed in the exhaust stream to provide a substantially unobstructed flow path for exhaust gases in the exhaust stream from the engine to the burn-off catalyst. Lastly, this exhaust system comprises a diverter body 46 positioned proximate to the center of the first flow region 44 and a source and conduit for diversion fluid 47 for diverting the exhaust gases away from the first region into the second region 45 to adsorb hydrocarbons while the second region 45 is below the molecular sieve's desorption temperature.

A "molecular sieve" as used herein refers to crystalline substances or structures having pore sizes suitable for adsorbing molecules. The term is generally used to describe a class of materials that exhibit selective absorption properties. To be a molecular sieve, as disclosed herein the material must separate components of a mixture on the basis of molecular size and shape differences. Such materials include silicates, the metallosilicates, metalloaluminates, the $AlPO_4S$, silico- and metalloaluminophosphates, zeolites and others described in R. Szostak, *Molecular Sieves: Principles of Synthesis and Identification*, pages 2–6 (Van Nostrand Reinhold Catalysis Series, 1989). Furthermore, the terms "adsorber" and "adsorption" as used herein are intended to encompass both adsorption and absorption as these terms are generally known to persons skilled in the art and as defined in *Webster's Ninth New Collegiate Dictionary* (1985); it is contemplated that both processes of adsorption and absorption occur in the molecular sieve structure of the invention.

If the honeycomb substrate comprises a molecular sieve structure, it, preferably, comprises zeolites supported on the honeycomb structure, with the zeolites selected from the group consisting of ZSM-5, USY, Mordenite, Beta zeolites and combinations of these. On the other hand, the molecular sieve structure may comprise an extruded zeolite selected from the same zeolite group.

Although one particular embodiment of this exhaust system is in a system where the honeycomb substrate is a molecular sieve or adsorber, it is contemplated that the honeycomb structure of the instant exhaust system could, simply be a catalyst structure. Preferably, a three-way catalyst, a light-off catalyst, an electrically heated catalyst, an oxidation catalyst or combinations thereof.

Figure 23C:
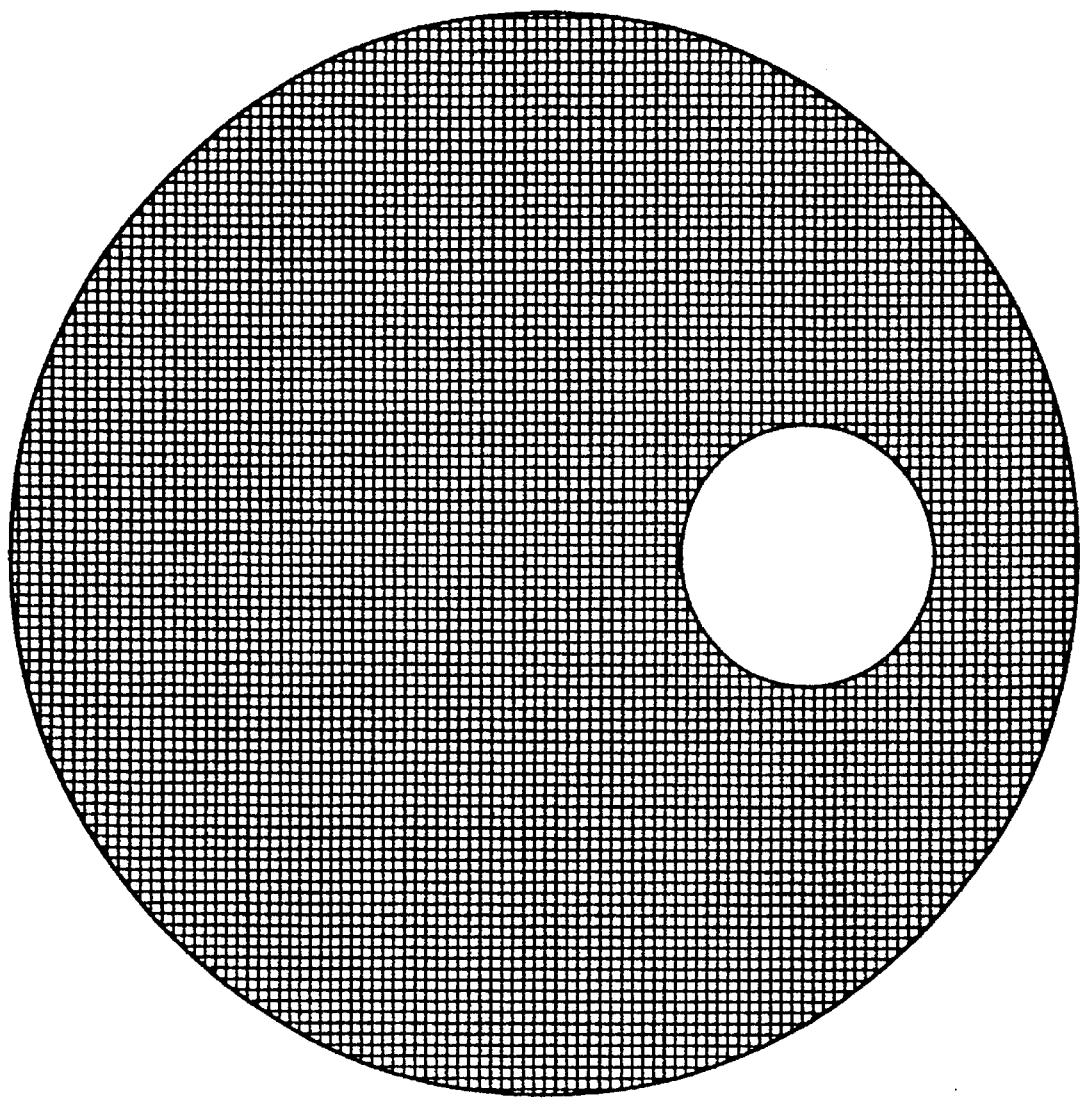
Figure 23A:
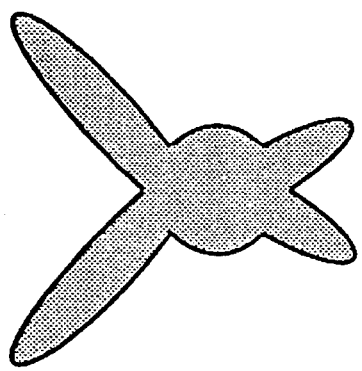
Figure 23B:
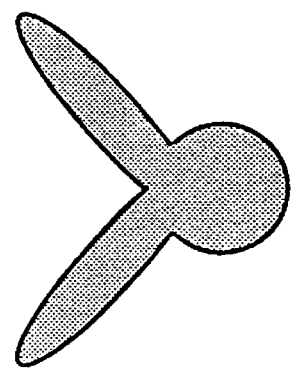

Referring now to FIGS. 22 A, B, C and 23 A, B, C, depicted therein are additional embodiments of diverter bodies and of substrates useful in the instant exhaust system. Specifically, FIG. 22 A and B illustrate the frontal view of two diverter body configurations which could be utilized to obtain a uniform flow for the elliptical substrate exhibiting an off-centered low-flow resistance region, the inlet face of which is depicted in FIG. 22 C. On the other hand, FIGS. 23 A and B illustrate two diverter body configurations which could be utilized to obtain a uniform flow for the round substrate exhibiting an off-centered low-flow resistance region, the inlet face of which is depicted in FIG. 23 C.

The present invention is hereinafter described in more detail by way of Examples. However, the present invention is not restricted to these examples. In other words, the following non-limiting examples are presented to more fully illustrate the invention.

EXAMPLES

Examples 1–3

A simulated exhaust system resembling the system as depicted in FIGS. 6–9 was used to illustrate the increase in flow uniformity of an exhaust system comprising an X-shaped diverter body. Specifically, the exhaust system was comprised of the following: (1) a 400 cell per square inch (cpsi) elliptical honeycomb structure exhibiting a long and short axis of 5.82 in. (14.8 cm) and 3.3 in. (8.4 cm), respectively, and a first flow region, a circular center hole, exhibiting a diameter of 1.89 in. (4.8 cm); and, (2) a fluidics apparatus comprised of an X-shaped diverter body, designated as AA and illustrated in FIG. 10, positioned proximate to the honeycomb substrate's center hole/first flow region at varying distances from the inlet face of the honeycomb (L) and 0.039 in. (1 mm) downstream of a diversion fluid conduit outlet—an air supply tube. Air, simulating exhaust flow, was passed into the housing and directed at the honeycomb substrate at a volumetric flow rate of about 40 cubic feet per minute (cfpm). The linear flow rate, in feet per minute (fpm) of the air leaving the honeycomb substrates was measured at several horizontal and vertical positions on the downstream face of the honeycomb structure utilizing a hand held Omegaflo model 610 Anemometer, and thereafter used to generate a flow profile for each of the Examples. Table I reports the average linear flow velocity in the central region (Cent. Flow V.) and in the peripheral region (Periph. Flow V.) generated from the flow measurements.

Figure 24:
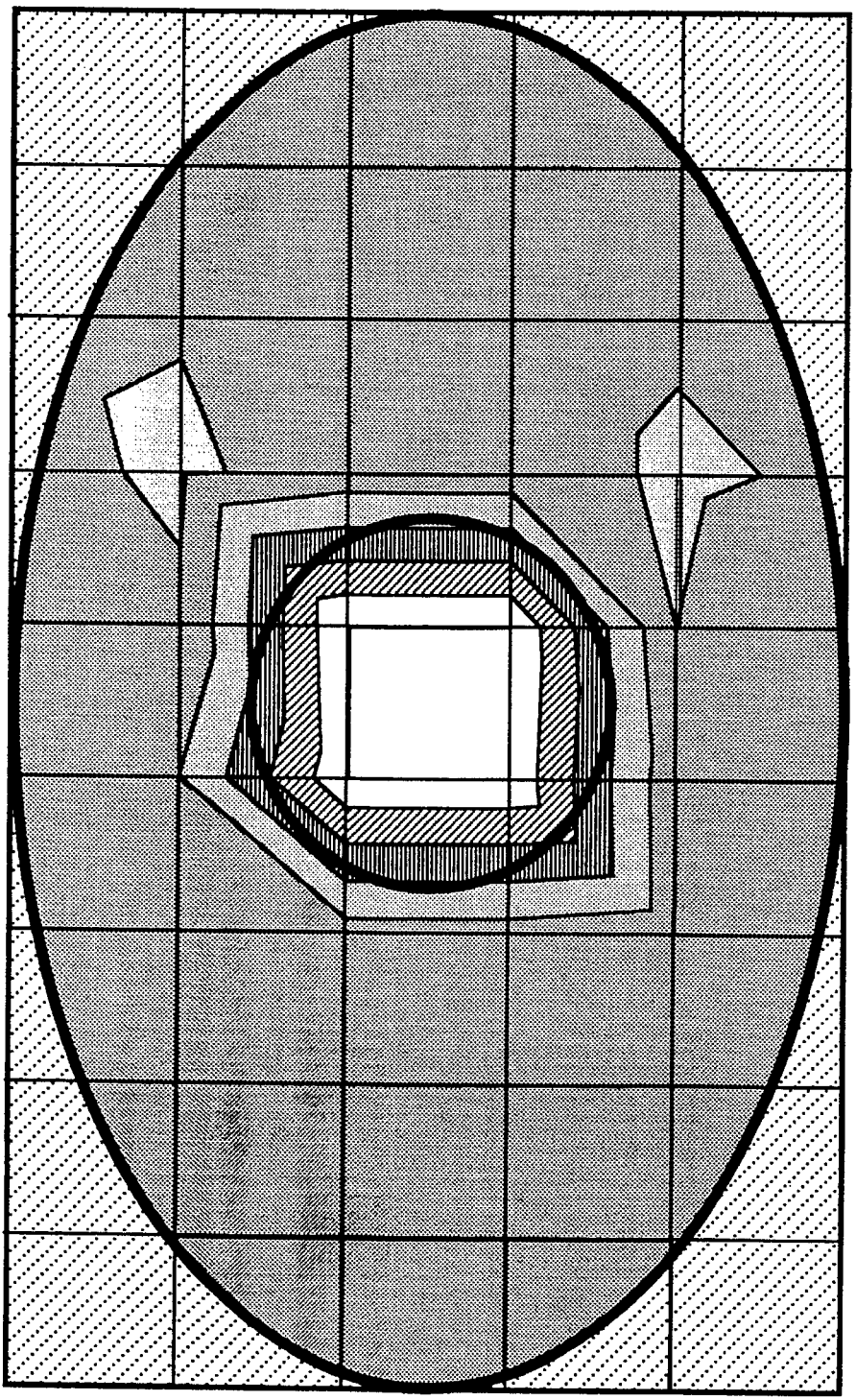
FIG. 24 is graphical illustration of the uniform flow profile exhibited by an elliptical honeycomb under diverted exhaust flow conditions utilizing the X-shaped diverter body designated AA.

FIG. 24 illustrates a graphical representation of, i.e., the uniform flow profile of, the Example 1 (Diverter AA) 40 cfpm simulated exhaust (diverter-on) flow data; the honeycomb substrate and low-flow resistance region images superimposed on the profile. This flow profile is representative of the typical and desired uniform flow which is achieved through the utilization of the X-shaped diverter body.

TABLE III

| Ex. No. | Exhaust/ Diverter | L (in/cm) | Center Flow V. (cfpm) | Periph. Flow V. (cfpm) | Fractional flow in hole |
| --- | --- | --- | --- | --- | --- |
| 1 | 40 cfpm/N | 5 | 1400 | 163 | 0.74 |
|   | 40 cfpm/Y |   | −165 | 715 | −0.08 |
| 2 | 40 cfpm/N | 7 | 1275 | 156 | 0.73 |
|   | 40 cfpm/Y |   | −250 | 788 | −0.12 |
| 3 | 40 cfpm/N | 9 | 1475 | 149 | 0.76 |
|   | 40 cfpm/Y |   | 105 | 756 | 0.04 |

Examples 4–9

Table IV reports the average linear flow rates, measured and calculated as above, exhibited by an elliptical honeycomb substrate as described in Examples 1–3 above and subjected to an simulated exhaust flow rate of 40 cfpm, both undiverted and utilizing various fluidic apparatus body configurations; differently shaped and sized X-shaped diverters (diverter configurations BB–EE) and varying diverter body to substrate inlet face distances (L).

Figure 25:
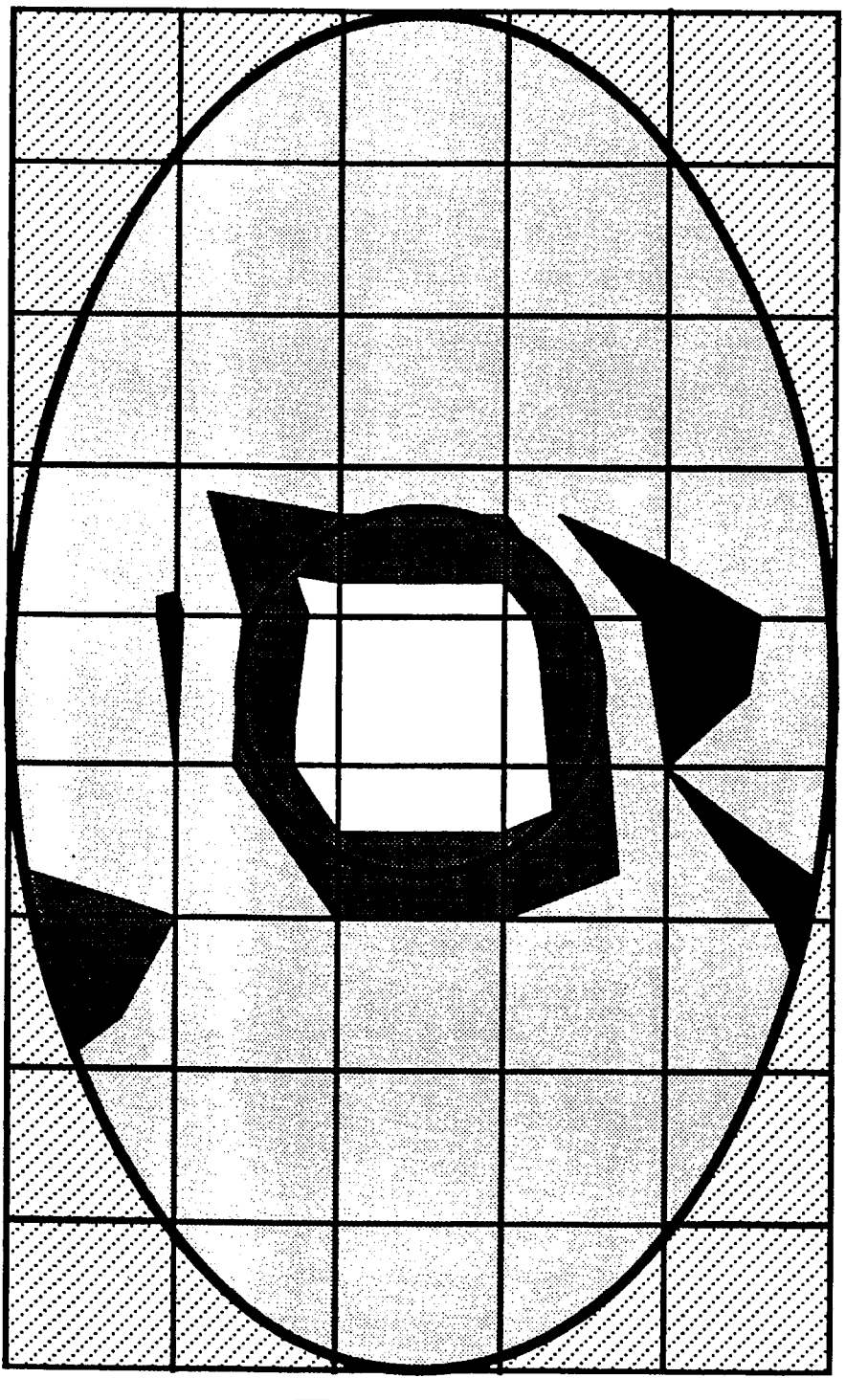
FIG. 25 is graphical illustration of the uniform flow profile exhibited by an elliptical honeycomb under diverted exhaust flow conditions utilizing the X-shaped diverter body designated BB.

FIG. 25 illustrates another graphical representation of the desired and uniform flow profile exhibited as a result of the utilization of an X-shape diverter body; specifically, that exhibited by Example 4 (Diverter BB) configuration subjected to a 40 cfpm (diverter-on) simulated exhaust flow. Again, the illustration depicts the honeycomb substrate and low-flow resistance region images superimposed on the profile.

TABLE IV

| Ex. No. | Exhaust/ Diverter Flow | Div. No. | L (in/cm) | Center Flow V. (cfpm) | Periph. Flow V. (cfpm) | Fractional flow in hole |
| --- | --- | --- | --- | --- | --- | --- |
| 4 | 40 cfpm/Y | BB | 9 | 1450 | 165 | 0.74 |
|   | 40 cfpm/N |   |   | 275 | 704 | 0.11 |
| 5 | 40 cfpm/Y | CC | 11 | 1512 | 169 | 0.74 |
|   | 40 cfpm/N |   |   | 325 | 751 | 0.12 |
| 6 | 40 cfpm/Y | DD | 6 | 1375 | 170 | 0.72 |
|   | 40 cfpm/N |   |   | −225 | 897 | −0.09 |
| 7 | 40 cfpm/Y | DD | 8 | 1550 | 158 | 0.76 |
|   | 40 cfpm/N |   |   | 118 | 50 | 0.05 |
| 8 | 40 cfpm/Y | EE | 9 | 1325 | 162 | 0.73 |
|   | 40 cfpm/N |   |   | 200 | 754 | 0.08 |
| 9 | 40 cfpm/Y | FF | 9 | 1250 | 158 | 0.72 |
|   | 40 cfpm/N |   |   | 120 | 734 | 0.05 |

Example 10–15

Table V reports the average linear flow rates, measured and calculated as above, exhibited by an elliptical honeycomb substrate as described in Examples 1–3 above and subjected to an simulated exhaust flow rate of 40 cfpm, both undiverted and utilizing various fluidic apparatus body configurations; differently shaped and sized "H-shaped" shaped diverters (diverter configurations GG–HH) and varying diverter body to substrate inlet face distances (L).

Figure 26:
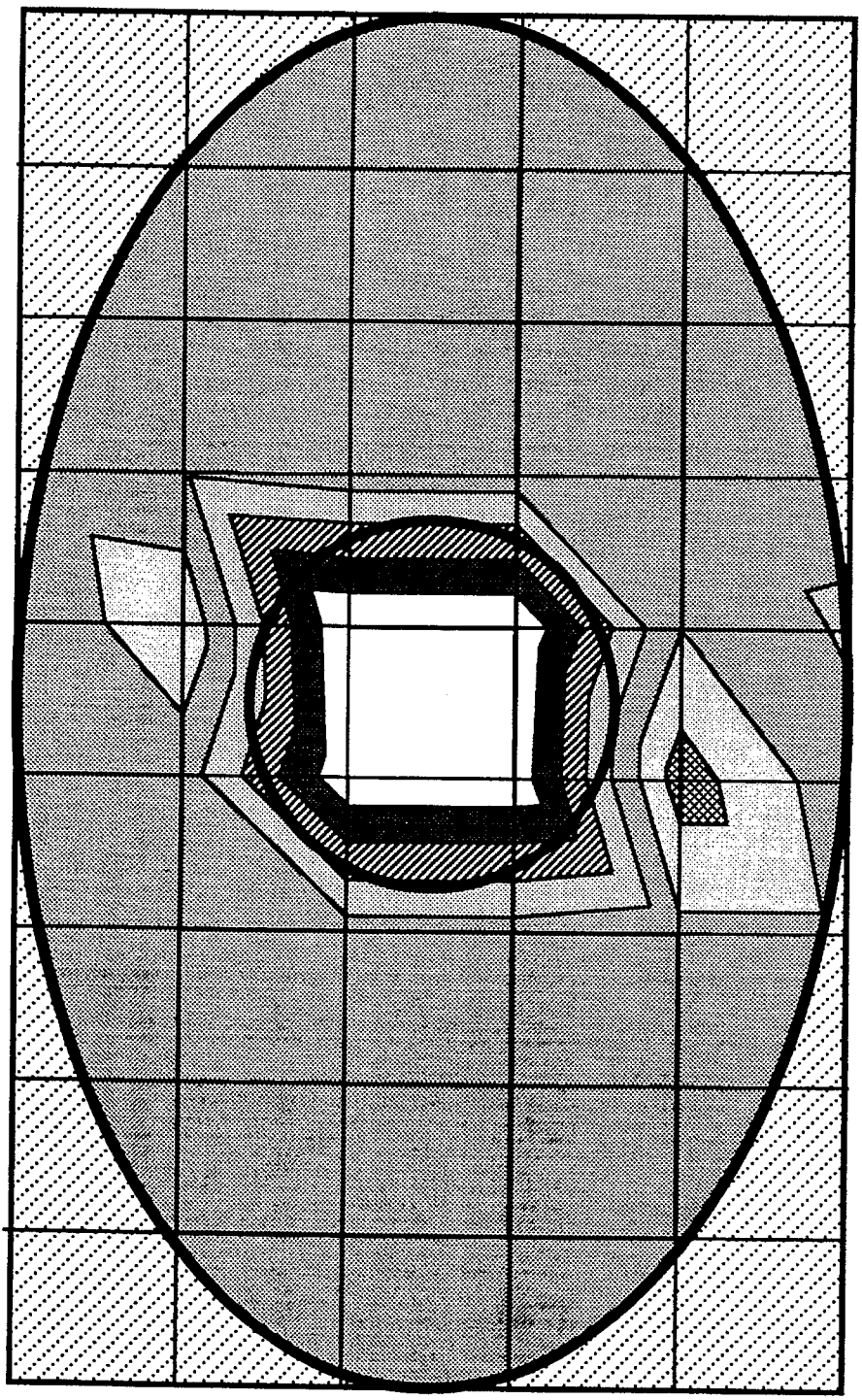
FIG. 26 is a graphical illustration of the uniform flow profile exhibited by an elliptical honeycomb under diverted exhaust flow conditions utilizing the H-shaped diverter body designated GG (Example No. 10)

FIGS. 26 illustrates a graphical representation of, i.e., the uniform flow profile of, the Example 10 (Diverter GG) 40 cfpm simulated exhaust (diverter-on) flow data; the honeycomb substrate and low-flow resistance region images superimposed on the profile. This flow profile is representative of the typical and desired uniform flow which is achieved through the utilization of the H-shaped diverter body.

TABLE V

| Ex. No. | Exhaust/ Diverter | Div. No. | L (in/cm) | Center Flow V. (cfpm) | Periph. Flow V. (cfpm) | Fractional flow |
| --- | --- | --- | --- | --- | --- | --- |
| 10 | 40 cfpm/Y | GG | 7 | 1525 | 171 | 0.74 |
|   | 40 cfpm/N |   |   | −170 | 706 | −0.08 |
| 11 | 40 cfpm/Y | GG | 10 | 1550 | 172 | 0.74 |
|   | 40 cfpm/N |   |   | 150 | 810 | 0.06 |
| 12 | 40 cfpm/Y | HH | 7 | 1325 | 177 | 0.71 |

TABLE V-continued

| Ex. No. | Exhaust/ Diverter | Div. No. | L (in/cm) | Center Flow V. (cfpm) | Periph. Flow V. (cfpm) | Fractional flow |
|---|---|---|---|---|---|---|
|  | 40 cfpm/N |  |  | −250 | 808 | −0.11 |
| 13 | 40 cfpm/Y | II | 7 | 1420 | 172 | 0.73 |
|  | 40 cfpm/N |  |  | −285 | 842 | −0.12 |
| 14 | 40 cfpm/Y | JJ | 9 | 1625 | 159 | 0.77 |
|  | 40 cfpm/N |  |  | 240 | 834 | 0.09 |
| 15 | 40 cfpm/Y | KK | 7 | 1525 | 179 | 0.74 |
|  | 40 cfpm/N |  |  | −275 | 899 | −0.11 |

Comparison Examples 16–20

Figure 27:
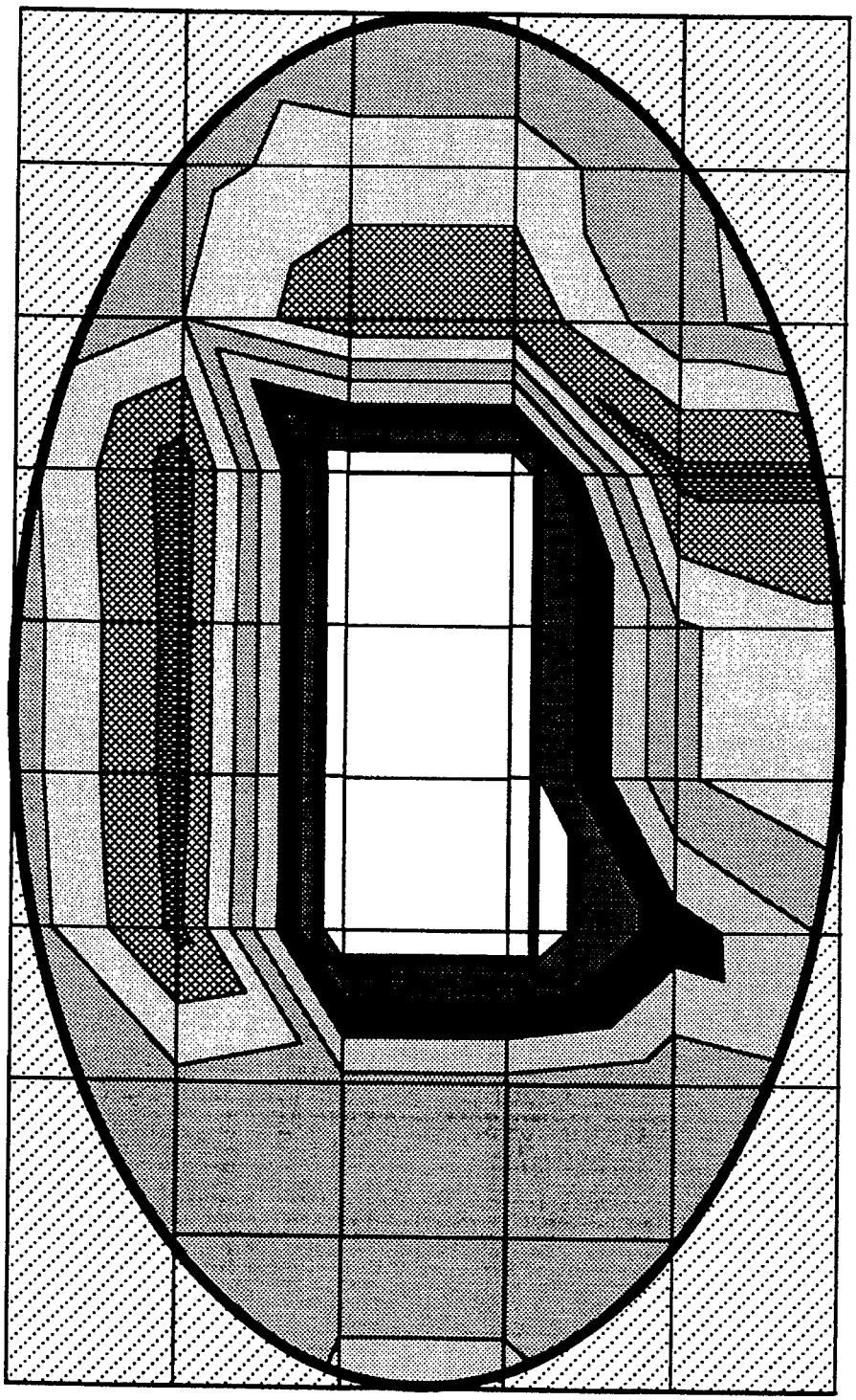
FIGS. 27 is graphical illustration of the non-uniform flow profile exhibited by an elliptical honeycomb possessing variously shaped central holes under diverted exhaust flow conditions utilizing an elliptical diverter body—Example No. 16.

A simulated exhaust system resembling the system as depicted in FIGS. 1–3 but without the diverter body having extensions, was used to compare the flow characteristics of the two systems. Specifically, these comparison exhaust systems were comprised of the following: (1) a 400 cell per square inch (cpsi) elliptical honeycomb structure as described above possessing a first or low-flow resistance region of varying shape and size (S) as listed in Table VI and, (2) a fluidics apparatus comprised of an 1.42×0.55 in. (3.6×1.4 cm) elliptical diverter body positioned proximate to the honeycomb substrate's hole region at varying distances from the inlet face of the honeycomb (L) as listed in Table VI, and 0.039 in. (1 mm) downstream from the diversion fluid conduit (air supply tube) outlet. Air, simulating exhaust flow, was directed at the honeycomb substrate at a volumetric flow rate of about 40 cubic feet per minute (cfpm) and diverter air of 10 cfpm was introduced through the fluid supply conduit. The diverted linear flow rate, in feet per minute (fpm) of each of the comparison system examples, Examples (Ex No.) 16–20 was measured, as before, and used to generate flow profiles for each of the Examples. An examination of the FIGS. 27 (Ex. No. 16 flow profile) and 4 (Ex No. 20 flow profile) illustrate the non-uniform flow profile which was obtained when using fluidics apparatus which included either a round or elliptical shaped main diverter body with no extensions. The FIGS. show that although the fluidics apparatus resulted in diverted flow away from the center hole or low-flow resistance region the resultant flow in the periphery was quite non-uniform, specifically, the flow in the peripheral region above and below the center hole was much higher than that experienced by the right and left regions of the periphery.

TABLE VI

| Ex. No. | L (in/mm) | S (in/cm) |
|---|---|---|
| 16 | 0.47/12 | rectangular 1.57 × 1.03/ 4.0 × 2.6 |
| 17 | 0.47/12 | round 1.54/3.9 |
| 18 | 0.43/11 | round 1.63/4.15 |
| 19 | 0.37/9.5 | rectangular 1.89 × 1.38/ 4.8 × 3.5 |
| 20 | 0.45/11.5 | round 1.89/4.8 |

Comparison Examples 21–24

Comparison Examples 21–24 are further examples of exhaust systems having fluidic apparatus which result in non-uniform diverted flow of a simulated 40 cfpm exhaust stream. These systems were similar to that of the Comparison examples above, though having varying diverter shapes and sizes as well as varying low-flow resistance region shapes and sizes as reported in TABLE VII. The simulated exhaust, the diverter fluid and the measurements were the same as above.

FIGS. 3 and 5, flow profiles for the flow data generated by Examples 21 and 22 respectively, again depict a non-uniform diverted flow exhibiting a much higher positive flow in the peripheral regions above and below the central hole when compared to those peripheral regions to the left and the right.

TABLE VII

| Ex. No | Diverter Shape & Size (in/cm) | L (in/mm) | S (in/cm) |
|---|---|---|---|
| 21 | elliptical 3.40 × 1.6 | 0.51/13 | round 1.89/4.8 |
| 22 | round 2.1 | 0.30/7.5 | round 1.89/4.8 |
| 23 | round 3.2 | 0.43/11 | elliptical 2.6 × 1.3 6.6 × 3.3 |
| 24 | elliptical 4.1 × 1.6 | 0.43/11 | elliptical 2.6 × 1.3 6.6 × 3.3 |

It will be appreciated from the foregoing description that the present invention has utility in a variety of systems for treating gas or other fluid streams, including any system wherein the handling of gas flows without the use of mechanical valves or other mechanical means of flow control is required. However, the systems of most immediate interest for such use are those involving the treatment of exhaust emissions from engines or other combustion exhaust gas sources. Accordingly, the preceding detailed description of the invention focused principally on such emissions control applications even though the use of the invention is not limited thereto.

Although the invention has been described with respect to the above illustrated description and examples, it may be subjected to various modifications and changes without departing from the scope of the invention. For example, although the examples have utilized only square cell channels, the invention can be extended to a variety of cell shapes for the honeycomb, (triangular, hexagonal, rectangular, flexible cells etc.).

We claim:

1. An engine exhaust system comprising:

a honeycomb structure having an inlet and outlet end disposed in a housing and located in an exhaust gas stream downstream from an engine, the honeycomb structure having a first substantially unobstructed flow region, and a second more obstructed flow region adjacent the first region, the first region being disposed to provide a substantially unobstructed flow path for the exhaust gases in the exhaust gas stream; and, a fluidics apparatus disposed in the exhaust stream proximate to the center of the first region comprising a diverter body, a diversion fluid source and a conduit possessing an outlet for directing the diversion fluid toward the diverter body, the diverter body exhibiting a main body and at least one pair of extensions.

2. The exhaust system of claim 1 wherein the conduit outlet is positioned upstream of the diverter body whereby the diverter body imparts a flow component to the diversion fluid which is transverse to flow direction in the first region.

3. The exhaust system of claim 1 wherein the fluidics apparatus is positioned whereby a negative flow zone is created within the first region in a direction opposite that of the exhaust gas flow.

4. The exhaust system of claim 1 wherein the diverter body comprises an elliptical or round shaped main body and at least one pair of symmetrical extensions attached at one end of the main body.

5. The exhaust system of claim 4 wherein the symmetrical extensions are positioned on the main diverter body whereby each of the individual extensions of the symmetrical pairs form equivalent angles with the horizontal axis of the main body.

6. The exhaust system of claim 5 whereby the diverter body comprises a pair of symmetrical extensions positioned at opposite ends of the main body, the individual extensions forming approximately a 30° angle with the horizontal axis of the main body.

7. The exhaust system of claim 1 wherein both the substrate inlet and outlet ends exhibit an elliptical shape.

8. The exhaust system of claim I wherein the extensions extend into an area proximate to the second flow region.

9. The exhaust system of claim 1, wherein the honeycomb structure is selected from the group consisting of (1) a variable cell honeycomb structure having a first group of cells and a second group of cells whose cell sizes are smaller than the first group of cells, and (2) a substantially cellular structure having an open core region running longitudinally parallel between the inlet and outlet ends of the structure and a peripheral region adjacent the open core, the peripheral region having a plurality of cells running longitudinally parallel between the inlet and the outlet ends of the structure.

10. The exhaust system of claim 9, wherein the central open core occupies an area in the range of 0.5 to 50% of the frontal area of the honeycomb structure.

11. The exhaust system of claim 1, wherein the honeycomb structure is centrally disposed in the housing, has a frontal area, wherein said first region comprises a central open core running longitudinally parallel between the inlet and outlet ends of the structure and the second region comprises a peripheral cellular structure characterized by a plurality of cells running longitudinally parallel between the inlet and the outlet ends of the structure.

12. The exhaust system of claim 1, wherein the honeycomb structure comprises a variable cell extruded honeycomb structure having a first central region and a second peripheral region surrounding said first region wherein cells in the first region are larger than the cells in the second region.

13. The exhaust system of claim 1, wherein the honeycomb structure is catalyst structure and comprises a three-way catalyst, a light-off catalyst, an electrically heated catalyst, an oxidation catalyst or combinations thereof.

14. The exhaust system of claim 1 wherein the honeycomb structure is a molecular sieve structure exhibiting a desorption temperature.

15. The exhaust system of claim 14 comprises wherein the molecular sieve structure comprises zeolites supported on the honeycomb structure, the zeolites selected from the group consisting of ZSM-5, USY, Mordenite, Beta zeolites and combinations of these.

16. The exhaust system of claim 14 wherein the molecular sieve structure comprises extruded zeolites selected from the group consisting of ZSM-5, USY, Mordenite, Beta zeolites and combinations of these.

* * * * *

UNITED STATES PATENT AND TRADEMARK OFFICE
CERTIFICATE OF CORRECTION

PATENT NO. : 5,619,853
DATED : April 15, 1997
INVENTOR(S) : Brown, Jacqueline L.

It is certified that error appears in the above-identified patent and that said Letters Patent is hereby corrected as shown below:

Column 7, line 35, "front" should be --frontal--.

Column 7, line 52, "bum-off" should be --burn-off--.

Column 12, line 25, "fight" should be --right--.

Signed and Sealed this

Fifteenth Day of December, 1998

*Attest:*

BRUCE LEHMAN

*Attesting Officer*     *Commissioner of Patents and Trademarks*